(No Model.)
W. H. WORTH.
DERRICK WAGON.
No. 248,683. Patented Oct. 25, 1881.
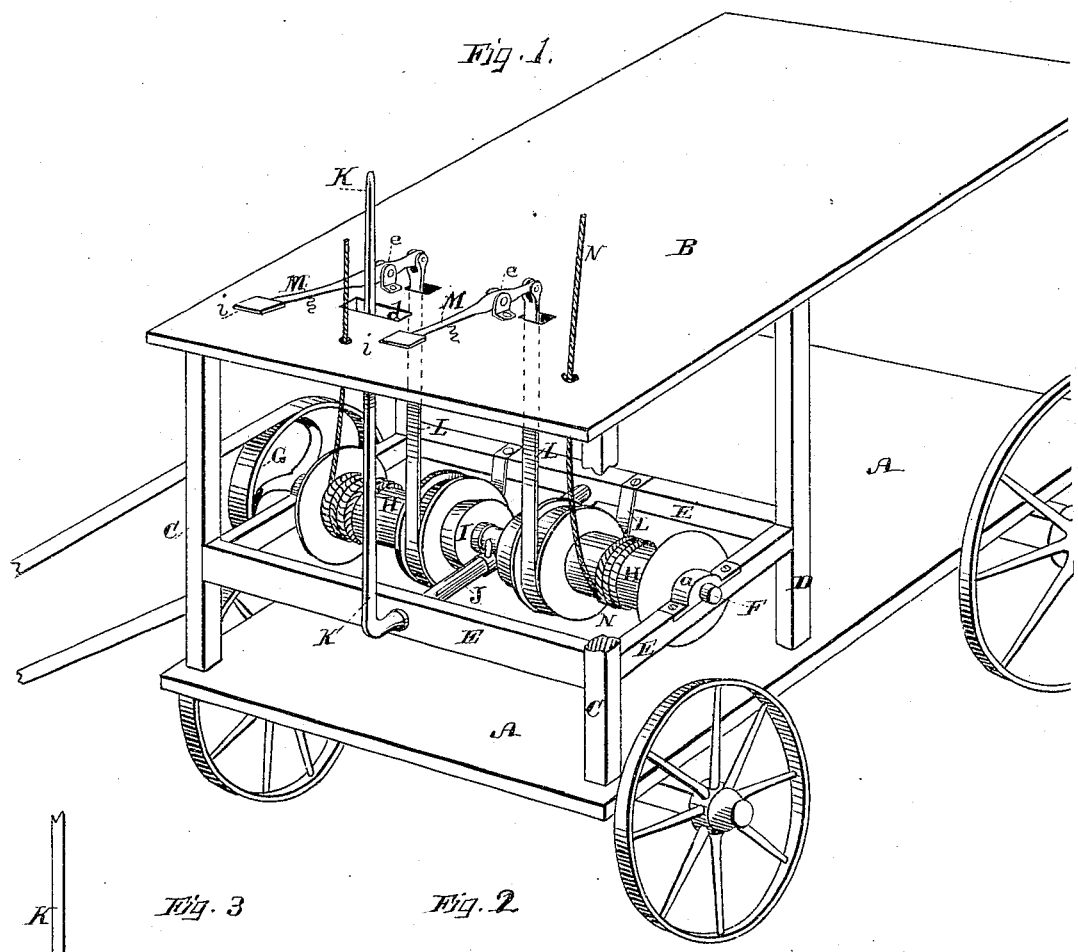
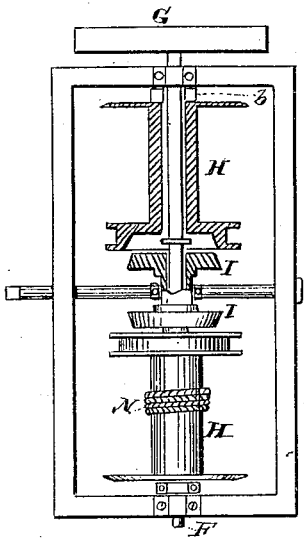
Witnesses
Geo. H. Strong.
Frank A. Brooks
Inventor
William H. Worth
By Dewey & Co
Attys.

UNITED STATES PATENT OFFICE.

WILLIAM H. WORTH, OF PETALUMA, CALIFORNIA.

DERRICK-WAGON.

SPECIFICATION forming part of Letters Patent No. 248,683, dated October 25, 1881.

Application filed August 11, 1881. (No model.)

*To all whom it may concern:*

Be it known that I, WILLIAM H. WORTH, of Petaluma, county of Sonoma, State of California, have invented an Improved Derrick-Wagon; and I hereby declare the following to be a full, clear, and exact description thereof.

My invention relates to that class of agricultural implements known as "derrick-wagons," and more especially to certain improvements in the means for operating the winding drums or spools, whereby the independent opposite lifting-forks are lowered with facility by the operation of a single lever.

The invention consists in two drums or spools loosely placed upon a shaft supported appropriately upon the frame of the wagon. The inner ends of these spools are adapted to receive a conical clutch, which is upon a feather on the shaft between the spools, and which is pushed to either side by a proper lever, and is forced alternately into the ends of the spools, causing them to revolve by friction, in combination with suitable braking devices provided for stopping the operation of either spool when necessary. All of this will be fully seen in the course of the following description, and by reference to the accompanying drawings, in which—

Figure 1 is a perspective view of my apparatus. Fig. 2 shows a top view of the gear. Fig. 3 shows a transverse section of the same.

The object of a derrick-wagon is to convey the straw from the stack to the platform of the wagon, from whence it is directed upon the carrying-belt, which conveys it to the separator. This object is accomplished by driving the wagon between two stacks and taking the straw by means of side forks worked alternately from the derrick-wagon. These forks are raised by appropriate ropes and pulleys, power being ordinarily applied to the device by horses. Some derrick-wagons are operated by the application of steam, and it is to this class that my invention belongs, being specially adapted to work by steam on account of the readiness with which the winding-spools may be thrown in and out of gear or checked by the brakes.

Let A represent an appropriate wagon having an upper platform, B, supported by end posts, C. On the forward part of the wagon are posts D, between which and the forward end posts are cross-timbers E, forming the frame supports or bearings for the operating mechanism now described. Across this frame work, journaled in appropriate boxes, $a$, on the cross-timbers E, is the driving-shaft F, having on one end a driving-pulley, G, to which steam-power is applied through suitable connections. Upon the shaft and fitting it loosely are the winding drums or spools H H, held in place on the inner ends by small collars or shoulders, and on their outer ends by collars $b$, which, for convenience in removing, are made in two pieces, bolted together. This construction is for the purpose of removing the collars and moving the spools to one side when they require cleaning. The inner heads of the spools have grooved faces, and their ends are hollowed or dished out to form a socket the periphery of which is conical.

I represents a double friction-clutch. It consists of two heads or ends, conical in shape, and a connecting-neck. This clutch fits upon the shaft F, between the inner ends of the two spools H H, which are separated sufficiently to allow it to rest between them, when in the center, without touching them. This clutch is fitted upon a feather, $m$, upon the shaft, so that it may move from side to side and yet turn with the shafts. Its conical ends or heads are small enough, and are intended to fit within the conical sockets of the ends of the spools H H, and by fitting them tightly produce sufficient friction when forced in to revolve said spools.

Under the clutch I is a rod, J, the ends of which are journaled in the cross-timbers E. It has attached to it upright pins or arms $c$, which extend up on each side of the neck of the clutch. Its forward end has rigidly attached to it a lever, K, which extends upward through a slot, $d$, in the platform B of the wagon. When the lever K is moved to one side it rocks the rod J over so that its arms $c$ come in contact with and push against one end or head of the clutch, which is thus forced into one of the spools and engages with it. When the lever K is moved the other way the rod J is rocked back to the other side, and causes its arms $c$ to force the clutch over into the other spool. The clutch, being upon a feather, can slide from side to side, and by being made to revolve with the shaft will cause the spools to revolve when engaged therewith.

In order to brake either spool when necessary I have the following device:

Attached to the rear cross-timber, E, are iron bands or straps L, which pass under the inner ends of the spools and proceed upward through the platform B. Their upper ends are bolted to horizontal levers M M, having their fulcrums at $e$. These levers have wide ends $i$, which serve as foot-rests. When they are pressed down by the foot they raise the straps L to fit into and press against the grooved faces of the ends of the spools, thereby causing enough friction to brake them immediately.

The remaining portions of the device are those common to derrick-wagons.

N represents ropes wound upon the spools H H, and proceeding over appropriate pulleys upon the mast, their other ends being attached to the forks.

A man stands upon the platform B, and by moving the lever K to one side engages the friction-clutch with one spool and operates the fork on that side, and by reversing the lever K operates the other fork.

This device I deem preferable to having two independent levers, which require a man on each side to operate.

Having thus described my invention, what I claim as new, and desire to secure by Letters Patent, is—

In a derrick-wagon, the combination of the loosely-journaled winding drums or spools H H and the braking-straps L, with their operating-levers M M, when arranged substantially as and for the purpose herein described.

In witness whereof I have hereunto set my hand.

WILLIAM HENRY WORTH.

Witnesses:
H. H. ATWATER,
T. J. HASKINS.